United States Patent [19]
Stevens et al.

[11] Patent Number: 4,811,901
[45] Date of Patent: Mar. 14, 1989

[54] PULSE FOG GENERATOR

[75] Inventors: Robert E. Stevens, Phoenix, Ariz.; Dennis A. Roudebush, Fortville, Ind.

[73] Assignee: Curtis Dyna-Products Corporation, Westfield, Ind.

[21] Appl. No.: 53,826

[22] Filed: May 26, 1987

[51] Int. Cl.$^4$ .............................. B05B 7/30; B01F 3/04
[52] U.S. Cl. ..................................... 239/138; 239/129; 261/DIG. 8; 261/DIG. 68; 43/129
[58] Field of Search ...................... 239/129, 137, 138; 261/DIG. 67, DIG. 68, DIG. 8; 417/472, 412; 251/73; 137/463; 43/129, 130

[56] References Cited
U.S. PATENT DOCUMENTS

| | | | |
|---|---|---|---|
| 1,677,729 | 7/1928 | Sams | 137/463 |
| 3,307,836 | 3/1967 | Arndt et al. | 261/DIG. 8 |
| 3,993,582 | 11/1976 | Curtis | 252/359 |
| 4,030,695 | 6/1977 | Curtis | 251/113 |
| 4,047,851 | 9/1977 | Bender | 417/472 |
| 4,271,093 | 6/1981 | Kobayashi | 261/DIG. 8 |
| 4,343,719 | 8/1982 | Stevens et al. | 239/129 |
| 4,462,346 | 7/1984 | Haman et al. | 261/DIG. 8 |
| 4,684,484 | 8/1987 | Guntly | 261/DIG. 8 |

FOREIGN PATENT DOCUMENTS
272382  2/1913  Fed. Rep. of Germany ...... 417/412

OTHER PUBLICATIONS
Operator's Instruction Manual for Pulse for Generator Golden Eagle Model 2610-Curtis Dyna-Products.

*Primary Examiner*—Andres Kashnikow
*Assistant Examiner*—Christopher G. Trainor
*Attorney, Agent, or Firm*—Woodard, Emhardt, Naughton Moriarty & McNett

[57] ABSTRACT

In the preferred embodiment of the present invention, a pulse fog generator powered by a resonant intermittent combustion device having a carburetor and a combustion antechamber, includes a starting air supply system for directing a flow of starting air into the antechamber, comprising an inlet/outlet check valve mounted over the discharge opening of a bellows that is reciprocated by a connecting rod eccentrically mounted to an electric motor. A priming pump is mounted on the carburetor, and comprises a priming fuel chamber hydraulically communicating with the carburetor and a piston reciprocatable within the priming fuel chamber to draw fuel from a fuel tank into the priming fuel chamber and to discharge the fuel from the priming fuel chamber into the carburetor. An on-off control for the combustion device includes a shut-off plate, disposed over the air inlet of the carburetor, affixed to a slidably mounted plunger so that the shut-off plate can be moved between a position covering and a position displaced from the air inlet. The pulse fog generator has a pressure responsive formulation control apparatus inserted between a formulation tank and means for injecting formulation into the exhaust tube of the combustion device. The control apparatus includes a shut-off valve biased to a closed position restricting the flow of the formulation, and a diaphragm actuator including an engagement pin, extending from a pressure actuated diaphragm, adapted to engage the shut-off valve and hold the valve in an open position while the combustion device is operating.

17 Claims, 6 Drawing Sheets

Fig.1

PULSE FOG GENERATOR

BACKGROUND OF THE INVENTION

1. Field of the Invention

The present invention is in the field of fogging devices. In particular the invention is directed toward fogging devices utilizing the pulse-jet, or resonant intermittent combustion principle.

2. Description of the Related Art

Fogging devices, used to generate an insecticide fog, for example, and utilizing the pulse-jet or resonant intermittent combustion principle, are well known in the prior art. An example of such devices is disclosed in Curtis, U.S. Pat. No. 3,993,582, Curtis U.S. Pat. No. 4,030,695, and Stevens et al., U.S. Pat. No. 4,343,719. Each of these patents discloses a fogging apparatus utilizing a resonant, intermittent combustion device, a fuel supply, a formulation supply, a formulation control device, and a starting device. In such prior art devices, the resonant intermittent combustion device is shut off by way of a valve located in the carburetor.

One such prior art device is described in an operator's instruction manual for a pulse-fog generator manufactured by Curtis Dyna-products Corporation of Westfield, Ind. The components of the pulse fog generator, as well as the operation of the device, is described for the GOLDEN EAGLE Model 2610. The apparatus of the present invention represents an improved version over these prior art devices. In particular, the present invention shows an improved starting system for the resonant intermittent combustion device, an improved combustion device shut-off system, and an improved formulation control device.

SUMMARY OF THE INVENTION

A pulse fog generator powered by a resonant intermittent combustion device using a carburetor to feed an air-fuel mixture into a combustion antechamber, includes a starting air supply system for directing a flow of starting air into the antechamber, comprising an inlet/outlet check valve mounted over the discharge opening of a bellows that is reciprocated by a connecting rod eccentrically mounted to an electric motor. The pulse fog generator further includes a priming pump for directing a quantity of starting fuel into the carburetor, comprising a priming fuel chamber hydraulically communicating with the carburetor and a piston reciprocatable within the fuel chamber to draw fuel from a fuel tank into the priming fuel chamber and to discharge the fuel from the chamber into the carburetor. An on-off control system for the pulse fog generator comprises a shut-off plate disposed over the air inlet for the carburetor affixed to a slidably mounted plunger so that the shut-off plate can be moved between a position covering and a position displaced from the air inlet. The pulse fog generator also includes a pressure responsive formulation control apparatus for terminating the flow of a formulation to be vaporized into the discharge tube of the combustion device in response to a cessation of operation of the resonant intermittent combustion device.

BRIEF DESCRIPTION OF THE DRAWINGS

FIG. 1 is a schematic view of the primary components of the pulse fog generator of the present invention.

FIG. 5b is a top view of the pump body shown in FIG. 5a.

DESCRIPTION OF THE PREFERRED EMBODIMENT

Figure 2:
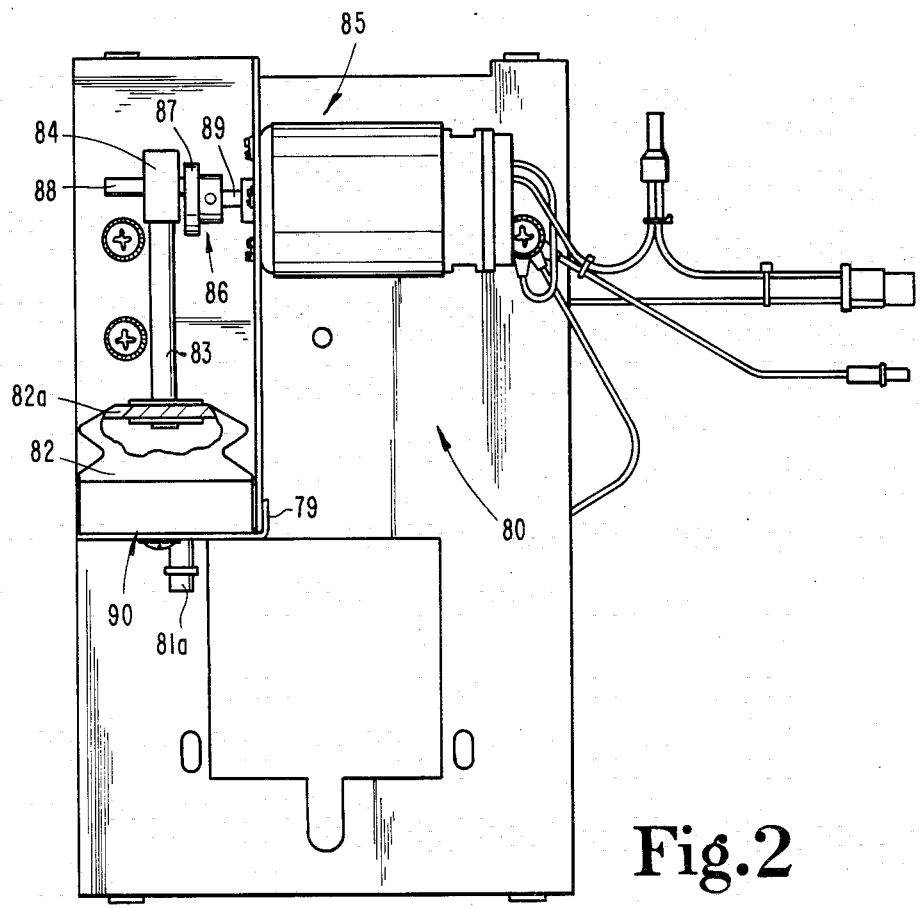
FIG. 2 is a fragmentary top view of the starting air supply system of a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 1:
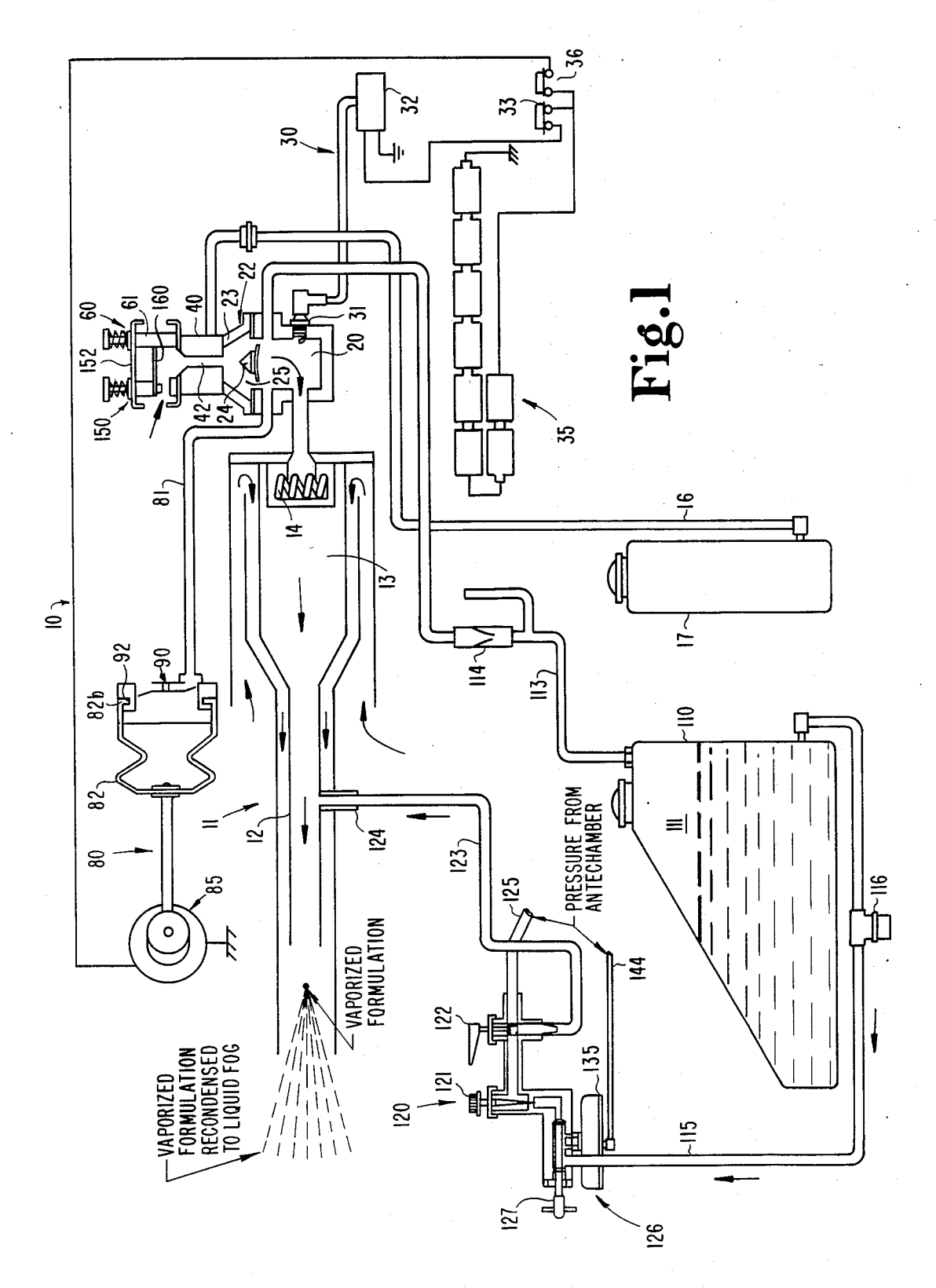

Referring first to FIG. 1, the various components of the pulse fog generator 10 of Applicants' preferred embodiment are schematically shown. The pulse fog generator 10 includes a resonant combustion device 11 comprising an exhaust tube 12, communicating at one end with a combustion chamber 13, the combustion chamber 13 having a thermal glow coil 14 functioning as a flame holder.

Flow of fuel and air into a combustion antechamber 20 and thence into the combustion chamber is controlled by a fuel-air inlet valve 22, comprising a housing 23 which is transversely divided by a conventional petal-type check valve 24 into an upper chamber 25 and the combustion antechamber 20. The petal-type check valve 24 is conventional and permits one-way introduction of a combustible fuel-air mixture into the combustion antechamber 20. An electrical spark generating system 30 has an electrode or spark plug 31 extending into the combustion antechamber and energized by a coil 32. The spark generating system is enabled by a first switch 33 connected to a power supply 35 during starting of the engine.

A carburetor 40 is disposed above the fuel-air inlet valve 22 and has a central throat passage 42. The carburetor 40 is a standard "pulse pump" type carburetor that has been modified for Applicants' invention as will be described herein. The central throat passage 42 extends through the carburetor and provides the primary air inlet into the carburetor and antechamber.

A priming pump assembly 60 is mounted atop the carburetor 40 and disposed generally above the central throat passage 42. An on-off control valve 150 is mounted on a mounting plate 152 that is affixed to a priming pump body 61 of the priming pump assembly 60. The on-off control valve 150 comprises a shut-off plate 160 that is situated above the central throat passage 42 and is adapted to cover the throat passage in order to terminate the flow of air into the carburetor when it is desired to shut the pulse fog generator 10 off. The priming pump 60 provides a means to inject fuel into the carburetor antechamber 20 during initial startup of the pulse fog generator. Once the generator is operating, a fuel delivery line 16 continuously supplies fuel from the fuel tank 17 to the carburetor.

A starting air supply system 80 injects air into the antechamber 20 during startup of the resonant combustion device 11. The starting air supply system 80 comprises a bellows 82, driven by a motor assembly 85, that intakes and expels air through an air pump body assembly 90 into a starting air line 81. The starting air line 81 communicates from the bellows 82 to the antechamber 20 to provide air to be mixed with fuel injected into the antechamber by the priming pump 60 during startup of the resonant combustion device 11.

The pulse fog generator 10 further comprises a formulation tank 110 that stores the liquid mixture or formulation 111 to be vaporized in the exhaust tube 12 during operation of the generator. A formulation pressure line 113 communicates between the combustion antechamber 20 and the formulation tank 110, through a formulation tank pressurizing valve 114, in order to pressurize the formulation tank in response to the operation of the pulse fog generator. A formulation tank line 115 exits the formulation tank 110 as shown and passes through a formulation filter 116. The formulation tank line 115 communicates with a metering/shut-off valve assembly 120 which comprises a formulation shut-off assembly 126 having a shut-off valve 127 and a diaphragm actuator 135, a formulation metering valve 121, and a three-way valve 122. The design and operation of the shut-off valve 127 and the diaphragm actuator 135 will be explained further herein.

The formulation metering valve 121 controls the rate of flow of formulation exiting the formulation tank line 115. The three-way valve 122 provides a means to flush the formulation lines once the fogging operation is complete. An outlet line 123 communicates from the three-way valve 122 to the formulation injection nozzle 124 opening into the exhaust tube 12. A pressure line 125 extending from the antechamber to the three-way valve 122 pressurizes the formulation flowing through the outlet line 123 to force the formulation through the formulation injection nozzle 124 into the exhaust tube 12.

In the operation of the pulse fog generator 10, fuel and air are continuously drawn through the carburetor 40 and antechamber 20 into the combustion chamber 13. The thermal glow coil 14, when heated, causes the fuel-air mixture to burn, generating heated high velocity gases. The high velocity gases exit the combustion chamber 20 into the exhaust tube 12 passing by the formulation injection nozzle 124. The venturi effect of the high velocity gases passing over the formulation injection nozzle 124, coupled with the pressurized formulation flowing through the outlet line 123, causes the formulation to enter the exhaust tube 12 and the flow of high velocity gases. The formulation is vaporized in the exhaust tube, but is subsequently recondensed to a liquid fog shortly after exiting the exhaust tube 12.

Having generally described the operation of the pulse fog generator, detailed description of Applicants' preferred embodiment will follow. In this embodiment, the starting system for the resonant combustion device 11, described with reference to FIGS. 2 and 3, comprises the starting air supply system 80. In FIG. 2, the flexible bellows 82 is shown mounted to one end of a connecting rod 83. The connecting rod 83 terminates at its distal end in a rod end 84. The rod end 84 is eccentrically and pivotably mounted to an eccentric assembly 86. In this embodiment, the eccentric assembly 86 comprises a disc 87 having a pin 88 affixed thereon, as shown in FIG. 2. The pin extends through a bore (not shown) in the rod end 84. The pin 88 is mounted off center on the disc 87 so that, as the disc rotates, the rod end 84 moves in an eccentric fashion. The electric motor assembly 85 includes a rotating output shaft 89. The disc is mounted at the end of a motor output shaft 89. Thus, the output shaft, and consequently the eccentric, rod end, and connecting rod are driven by the electric motor. Since the rod end 84 and connecting rod 83 are eccentrically mounted to the rotating eccentric assembly 86 and output shaft 89, the rotational motion of the output shaft is translated to a generally reciprocating motion of the connecting rod. The reciprocating motion of the connecting rod 83, consequently, extends and retracts the flexible bellows 82.

Figure 3:
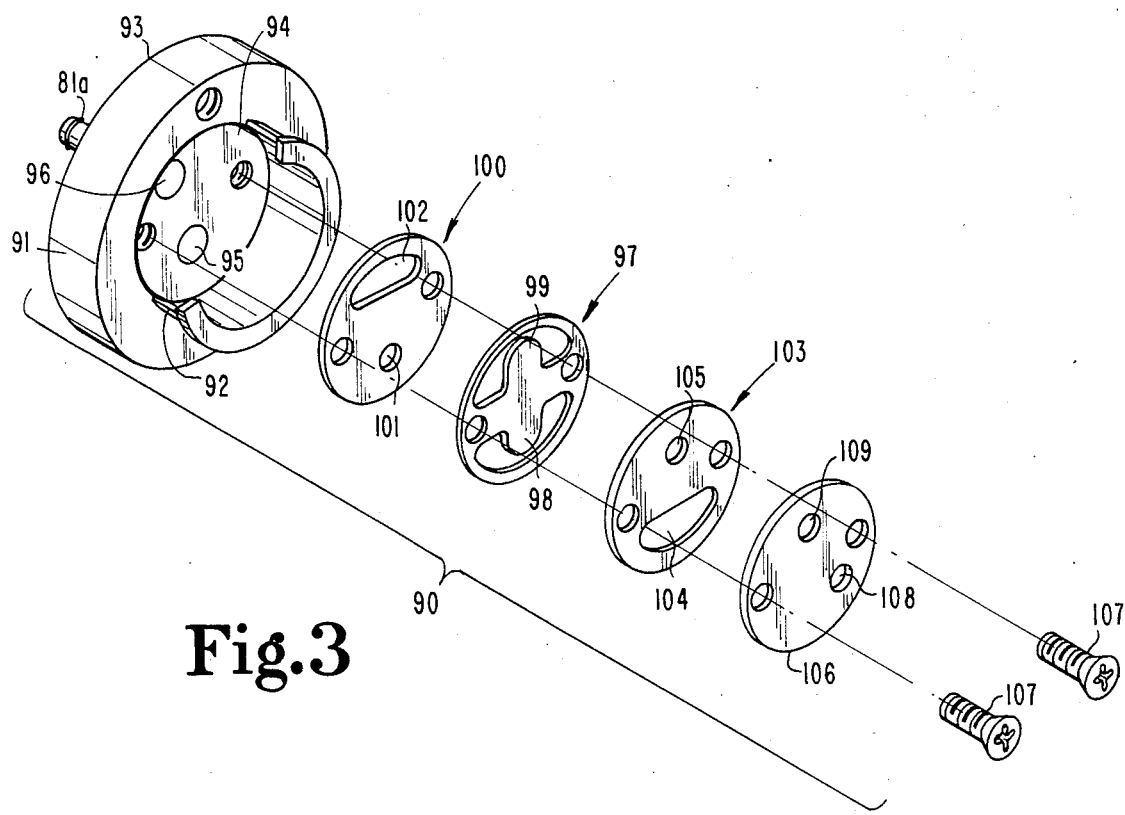
FIG. 3 is an enlarged exploded view of an air pump body assembly of the starting air supply system shown in FIG. 2.

Opposing the connection 82a between the connecting rod and the bellows is the air pump body assembly 90. Referring to FIG. 3, the air pump body assembly 90 comprises a pump body 91 having a circumferential groove 92 at one end of the pump body. The flexible bellows 82 has a cooperating sealing flange 82b (FIG. 1) that is resiliently engaged in the circumferential groove 92. The distal end 93 of the pump body 91 is mounted to a support bracket 79 that is mounted on the pulse fog generator 10. The pump body 91 further includes a recess 94 and two apertures 95 and 96 through the distal end 93 of the pump body and communicating with the recess. One aperture corresponds to an air inlet aperture 95 that provides an intake opening for atmosphere air, while the other aperture is an air outlet aperture 96. A check valve wafer 97 is sandwiched between two check port plates, an inlet plate 100 and an outlet plate 103. In alignment with the pump body air inlet aperture 95, the inlet check port plate 100, the check valve wafer 97, and the outlet check port plate 103 include, respectively, a first inlet bore 101, an inlet flapper valve 98, and an inlet opening 104. Similarly, in alignment with the air outlet aperture 96, the inlet check port plate, the check valve wafer, and the outlet check port plate comprise, respectively, an outlet opening 102, an outlet flapper valve 99, and a first outlet bore 105. A backup plate 106 is situated atop the two check port plates and the check valve wafer, and is affixed to the air pump body by two screws 107, as shown in FIG. 3. The backup plate includes a second inlet bore 108 communicating with the inlet opening 104 of the outlet check port plate 103 and a second outlet bore 109 communicating with the first outlet bore 105 in the outlet check port plate 103. The starting air line 81 (FIG. 1) is engaged over a fitting 81a extending from the pump body 91 at the air outlet aperture 96.

In operation, the bellows is driven by the connecting rod 83, eccentrically connected to the electric motor assembly 85, in a reciprocating fashion. As the connecting rod is drawn away from the air pump body assembly 90, the bellows is expanded, creating a vacuum in the interior of the flexible bellows. The vacuum created subsequently draws the inlet flapper valve 98 into the inlet opening 104 in the outlet check port plate 103. The inlet flapper valve 98 had previously covered and sealed the first inlet bore 101 in the inlet check port plate 100 so that air could not pass into the interior of the bellows. As the inlet flapper valve 98 is pulled by the vacuum into the inlet opening 104, the first inlet bore 101 in the inlet check port plate 100 is opened, allowing air to enter through the inlet bore 101, the enlarged inlet aperture 104, and finally, the second inlet bore 108 in the backup plate 106, into the interior of the bellows. The bellows is filled with air as the connecting rod reaches the end of this air intake stroke. On the return stroke, the bellows is compressed, forcing the air out of the bellows. As the air pressure acts against the air pump body assembly 90, the inlet flapper valve 98 is sealed against the first inlet bore 101 of the inlet check port plate 100, to prevent air from escaping through the air inlet aperture 95 in the pump body 91 to the atmosphere. Simultaneously, the outlet flapper valve 99 is flexed into the outlet opening 102 of the inlet check port plate 100 to open the first and second outlet bores 105 and 109 in the outlet check port plate 103 and the backup plate 106, respectively. Thus, the air in the bellows is forced, under pressure, through the air outlet aperture 96 in the air pump body 91, through the fitting 81a, and through the starting air line 81 to the combustion antechamber 20, as illustrated in FIG. 1.

Referring to FIG. 1, the electric motor that drives the bellows is connected to the power supply 35 via a second switch 36. Thus, when the second switch 36 is depressed, electricity is provided to the electric motor, energizing the motor and starting the air pumping operation. The starting air supply system 80 works in cooperation with a spark generating system, in this case the coil 32 and spark plug 31 shown in FIG. 1, to comprise the starting system for the resonant combustion device. Fuel introduced into the antechamber mixes with the starting air and is ignited by the spark plug.

The check valve wafer in the air pump body assembly 90 prevents the heated gases resulting from the explosion in the antechamber from escaping through the starting air line 81 and starting air supply system 80. However, the check valve wafer does not prevent air from being drawn into the antechamber by the vacuum resulting after the explosion, as the bellows 82 operates essentially as an auxiliary air chamber. During the vacuum pulse, the outlet flapper valve 99 of the check valve wafer is flexed, as well as the inlet flapper valve 98, so that air passes freely through the bellows and into the starting air line to the antechamber.

In one alternative to the present embodiment, the spark generating system 30 and the starting air motor assembly 85 are wired in parallel, and the first and second switches 33 and 36 are combined into one switch. In this instance, depressing the single switch starts the electric motor which ultimately introduces starting air into the combustion antechamber, while also energizing the coil causing the spark plug to spark.

The starting system of the present embodiment represents an improvement over the starting systems of the prior art that use a hand-operated air pump. Not only is operation of the hand pump to supply starting air to the antechamber cumbersome, it is also physically difficult for the operator. As the hand pump heats up, the piston expands, thereby increasing the force required to reciprocate the pump. In this embodiment, hand operation has been replaced by the electrical pneumatic air supply system.

Figure 4:
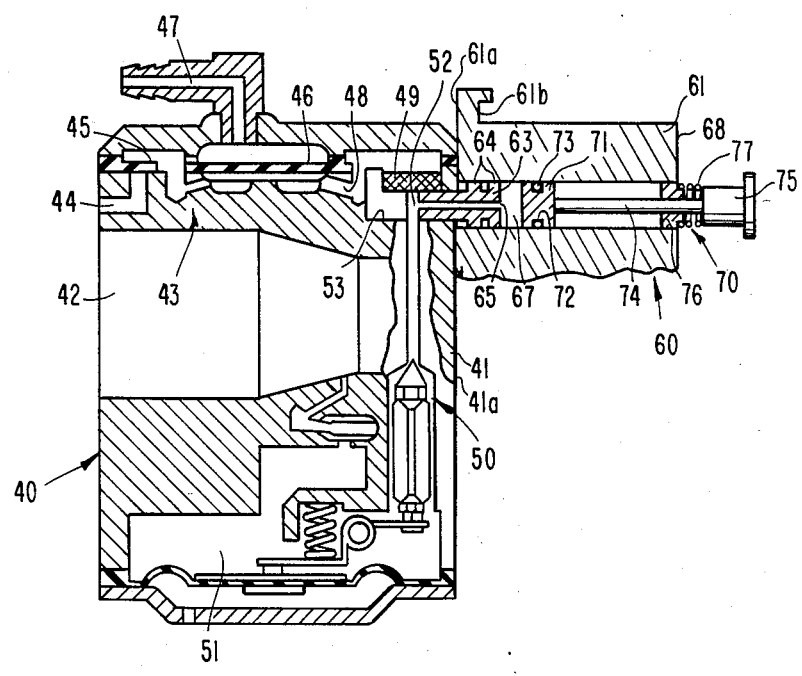
FIG. 4 is a fragmentary side sectional view of a carburetor with the priming pump assembly of the preferred embodiment of the present invention mounted thereon.

The starting system for the resonant combustion device 11 of the pulse fog generator 10 in Applicants' preferred embodiment also comprises a priming pump assembly 60. As illustrated in FIG. 1, the priming pump assembly 60 is mounted atop the carburetor 40 over the central throat passage 42. The details of the priming pump assembly will be illustrated with reference to FIG. 4.

As background information, the relevant details of the carburetor will be first described. The carburetor 40 includes a fuel pump assembly 43, which comprises a fuel inlet orifice 44, a fuel inlet valve 45, a fuel pump diaphragm 46, a pressure/vacuum pulse inlet 47, and a fuel outlet valve 48. Fuel from the fuel tank 17 (FIG. 1) passes through the fuel delivery line 16 to the fuel inlet orifice 44 of the carburetor 40. The fuel inlet valve 45 controls the flow of fuel into the carburetor, and prevents the backflow of fuel or air into the fuel delivery line 16. The fuel pump diaphragm 46 creates a vacuum when flexed which draws fuel into the carburetor through the fuel inlet valve 45. The fuel pump diaphragm 46 is flexed in response to the alternating pressure-vacuum pulses generated in the antechamber 20 by the operation of the resonant combustion device that are transmitted into the carburetor through the pressure/vacuum pulse inlet 47. The fuel inlet valve 45 is responsive to the flexing of the fuel pump diaphragm 46 so that it closes the fuel inlet orifice 44 when the diaphragm is flexed during the pressure pulse. The fuel inlet valve 45 is flexed to the open position when the diaphragm is retracted during the vacuum pulse. As the fuel pump diaphragm flexes, the fuel is pulled into the carburetor during the vacuum pulse, and pushed through the fuel outlet valve 48 during the pressure pulse.

The fuel in the carburetor passes through a fuel filter 49 and a fuel passageway 52, past an inlet needle valve 50, and into a metering chamber 51. Once in the metering chamber 51, the fuel is drawn into the central throat passage 42 of the carburetor by the venturi effect of air passing into the carburetor and through the central throat passage into the fuel/air inlet valve 22 and combustion antechamber 20. Once the engine is operating, air is constantly flowing through the carburetor and the central throat passage so that the fuel is automatically drawn into the carburetor and ultimately into the combustion antechamber. Furthermore, in an operating condition the fuel pump is also operational. However, in a start-up condition, the fuel pump is disabled, and no air is flowing into the carburetor sufficient to create a venturi effect to draw the fuel from the metering chamber into the carburetor. Consequently, the priming pump assembly is required to withdraw the fuel from the fuel tank and inject it directly into the carburetor so that a initial air and fuel mixture can be ignited.

Figure 5B:
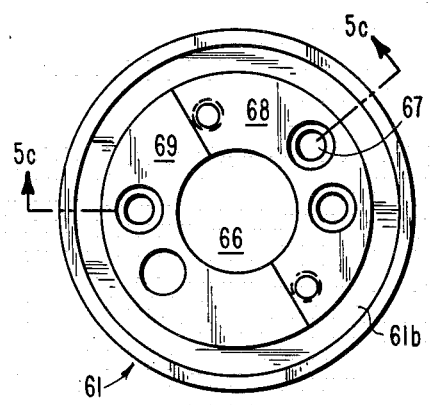
Figure 5C:
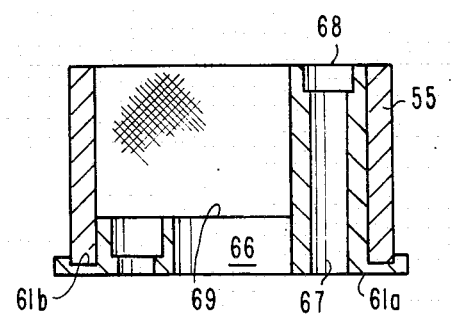
FIG. 5c is a side sectional view of the pump body shown in FIG. 5b taken along the line 5c—5c and viewed in the direction of the arrows, shown with an air filter installed.
Figure 5A:
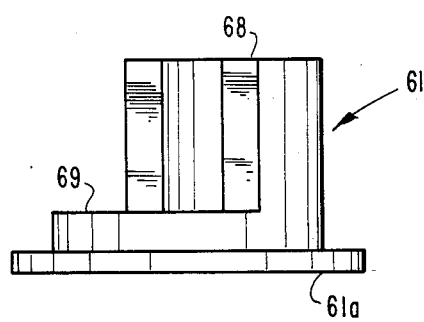
FIG. 5a is a side view of the pump body of the priming pump assembly shown in FIG. 4.

As previously noted, the priming pump assembly 60 of Applicants' invention is mounted directly on the carburetor 40. In this embodiment, an adaptor fitting bore 53 is drilled through the carburetor body 41 into the fuel passageway 52 directly adjacent the fuel filter 49. A pump adapter 63 is pressed into this bore, the pump adapter 63 having a pair of circumferentially sealing lands 64 and a central bore 65 communicating with the fuel passageway 52. A priming pump body 61, shown in detail in FIGS. 5a–5c, comprises a mounting surface 61a for mounting flush against a reciprocal mounting surface 41a on the carburetor body 41. A circumferential filter groove 61b receives an air intake screen or filter 55 therein (FIG. 5c). A central air intake bore 66 extends through the priming pump body 61 to provide a flow path for atmosphere air into the central throat passage 42 of the carburetor 40.

The priming pump body 61 further includes a priming fuel chamber 67 adapted to accept the circumferential sealing lands 64 of the pump adapter 63 in a press fit. The priming pump body is appropriately fixed on the carburetor, such as by bolts, so that the pump adapter is in simultaneous press-fit engagement in the adapter fitting bore 53 of the carburetor and in the priming fuel chamber 67 of the priming pump body 67.

Referring again to FIG. 4, a priming piston assembly 70, having a piston head 71 with an O-ring groove 72 and an O-ring 73 resiliently mounted thereto, a piston rod 74 connected to the piston head, and a knob 75 attached at the distal end of the piston rod 74, is situated in the priming fuel chamber 67 in the priming pump body 61. A retaining member 76, such as a press-fit hollow plug or a snap ring, located at the distal end of the chamber 67, prevents the piston head 71 from being completely withdrawn from the chamber. A biasing, or return, spring 77 situated between the retaining member 76 and the knob 75 biases the priming piston assembly 70 away from the carburetor and provides a return force against the knob 75 when the priming piston is pumped by the operator.

In operation, the priming piston head 71 is withdrawn in the priming fuel chamber 67. As the piston head 71 is withdrawn, a vacuum forms in the priming fuel chamber 67 as well as in the fuel passageway 52 in the carburetor 40. This vacuum in turn opens the fuel inlet valve 45 and draws fuel from the fuel tank 17 into the carburetor 40 in a fashion similar to the operation of the fuel pump diaphragm previously described. Once the fuel is withdrawn from the fuel tank into the fuel passageway 52 of the carburetor, the piston head 71 is stroked back into the chamber 67. The piston head exerts a pressure against the fuel which closes the fuel inlet valve 45 and causes the fuel to flow through the fuel passageway 52 past the inlet needle valve 50 and into the metering chamber 51. Since the fuel withdrawn by the priming piston is being forced under pressure by the priming piston head, the fuel flows freely into central throat passage 42 of the carburetor 40, without the necessity of the venturi effect created by air flowing through the central throat passageway. Thus, it can be seen that in the initial start-up of the resonant combustion device of the pulse fog generator, fuel is injected into the combustion antechamber 20 solely by manual operation of the priming piston since the fuel pump diaphragm 46 and pressure/vacuum pulse inlet 47 are inactive.

In starting the resonant combustion device using the starting system of Applicants' preferred embodiment, several strokes of the priming pump assembly may be necessary to inject a sufficient quantity of fuel into the antechamber. Air is also forced into the antechamber to mix with the fuel. The resulting fuel/air mixture is ignited by the spark generating system 30 and the resonant combustion device becomes self-sustaining. Once the initial explosion of the fuel/air mixture has occurred, the starter system becomes redundant and is no longer operational. At this point, the priming pump is no longer needed to withdraw and pump fuel into the carburetor, as the fuel pump diaphragm 46 is now activated by the alternating pressure/vacuum pulses transmitted through the pulse inlet 47. The O-ring 73 on the priming piston head 71 prevents any fuel from leaking from the priming fuel chamber 67.

The starter system of the present embodiment comprising the primary pump assembly 60 represents an improvement over the priming systems of earlier devices. In earlier devices, the fuel priming function was performed by operation of a manual air pump used to temporarily pressurize the fuel tank, causing fuel to be injected from the fuel delivery line into the carburetor. As described above, use of the manual pump is cumbersome and physically difficult. The priming pump assembly is easier to operate, having a short stroke of 1 to 1½ inches. Furthermore, there is no need to pressurize the fuel tank during the priming operation, which translates to a simplified fuel control system. The priming pump assembly of Applicants' novel starting system allows for a minor modification to a stock pulse pump type carburetor and provides an improved fuel priming operation for the start-up of the resonant combustion engine.

Figure 6:
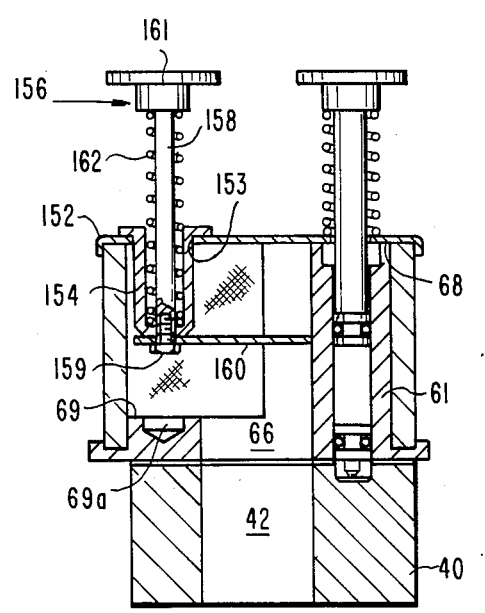
FIG. 6 is a side sectional view of the on-off control valve of the preferred embodiment of the present invention, shown mounted on a priming pump body and carburetor.

The preferred embodiment of Applicants' invention includes a on/off control valve 150 mounted directly above the central throat passage 42 of the carburetor 40 to terminate the airflow through the carburetor to the antechamber 20. A mounting plate 152 is affixed to the distal surface 68 of the priming pump body 61. Referring to FIG. 6, the mounting plate 152 includes a first bore 153 through which a bushing 154 is pressed. The bushing 154 is elongated and extends below the bottom surface of the mounting plate 152, as shown in FIG. 6. A plunger assembly 156 comprising a plunger rod 158 and a shut-off plate 160, affixed at one end of the rod by way of a pin or screw, is slidably situated within the bushing 154. A knob 161 is pressed or threaded onto the other end of the rod 158. The rod also passes through a helical spring 162 which is situated between the bushing and the knob 161 so that the spring reacts against the knob tending to push the plunger assembly 156 away from the central throat passage 42.

In the present embodiment, the priming pump body 61 described above further comprises a shut-off contact surface 69. The plunger rod 158 is of sufficient length that, when the rod is depressed, the shut-off plate 160 contacts flush against the contact surface 69, covering the air intake bore 66 in the pump body and, consequently, the central throat passage 42. A recess 69a in the contact surface 69 is situated to receive the head of the pin or screw 159 to allow the shut-off plate 160 to completely seal off the air intake bore 66.

The on/off control valve 150 of the present embodiment is used to prevent air from flowing into the carburetor, which starves the resonant combustion device 11 causing it to shut down. The on/off control valve is operated by depressing the knob 161 and plunger rod 158 which, in turn, pushes the shut-off plate 160 down into contact with the contact surface 69 of the pump body and covering the air intake bore 66 and central throat passage 42. Once the flow of air through the carburetor into the combustion antechamber is interrupted, the pressure/vacuum pulse cycle is terminated and the resonant combustion device 11 stops. Once the device 11 stops, the plunger assembly 156 can be released, and the spring 162 automatically retracts the plunger rod, and the shut-off plate, away from the air intake bore 66. The spring 162 also serves to keep the shut-off plate 160 away from the air intake bore 66 during operation of the engine.

The on/off control valve 150 of this embodiment represents an improvement of shut-off systems in similar resonant combustion devices and pulse fog generators, in particular. In the prior system, the combustion device was shut-off by manipulation of a valve or vane in the carburetor itself to stop the flow of fuel and air into the combustion antechamber. Applicants' invention simplifies the shut-off mechanism since a valve interior of the carburetor, along with the requisite mechanical devices to manipulate the valve, is not required. In addition, Applicants' on/off control valve is biased to permit airflow, unlike most prior systems.

Applicants' preferred embodiment includes a formulation shut-off assembly 126 interposed between the formulation tank outlet line 115 and the formulation metering valve 121. This formulation shut-off assembly 126 terminates the flow of formulation into the exhaust tube 12 of the resonant combustion device 11 once the pressure/vacuum pulse cycle is interrupted in the operation of the device, such as would occur when the device 11 ran out of fuel. Although once the pressure/vacuum pulse cycle of the engine is interrupted, the engine has essentially come to a stop, residual fuel/air mixture in the combustion chamber 13, combined with the formulation mixture that may flow into the exhaust tube 12, may be ignited by the glow coil causing an explosion or fire. Furthermore, even in the absence of residual fuel/air mixture in the combustion chamber, the intense heat in the combustion chamber and exhaust tube can also cause the formulation mixture to explode or catch fire. This danger is greatly minimized if the flow formulation into the discharge tube is terminated immediately when the operation of the engine is terminated. The formulation shut-off assembly 126 performs this function.

Figure 7:
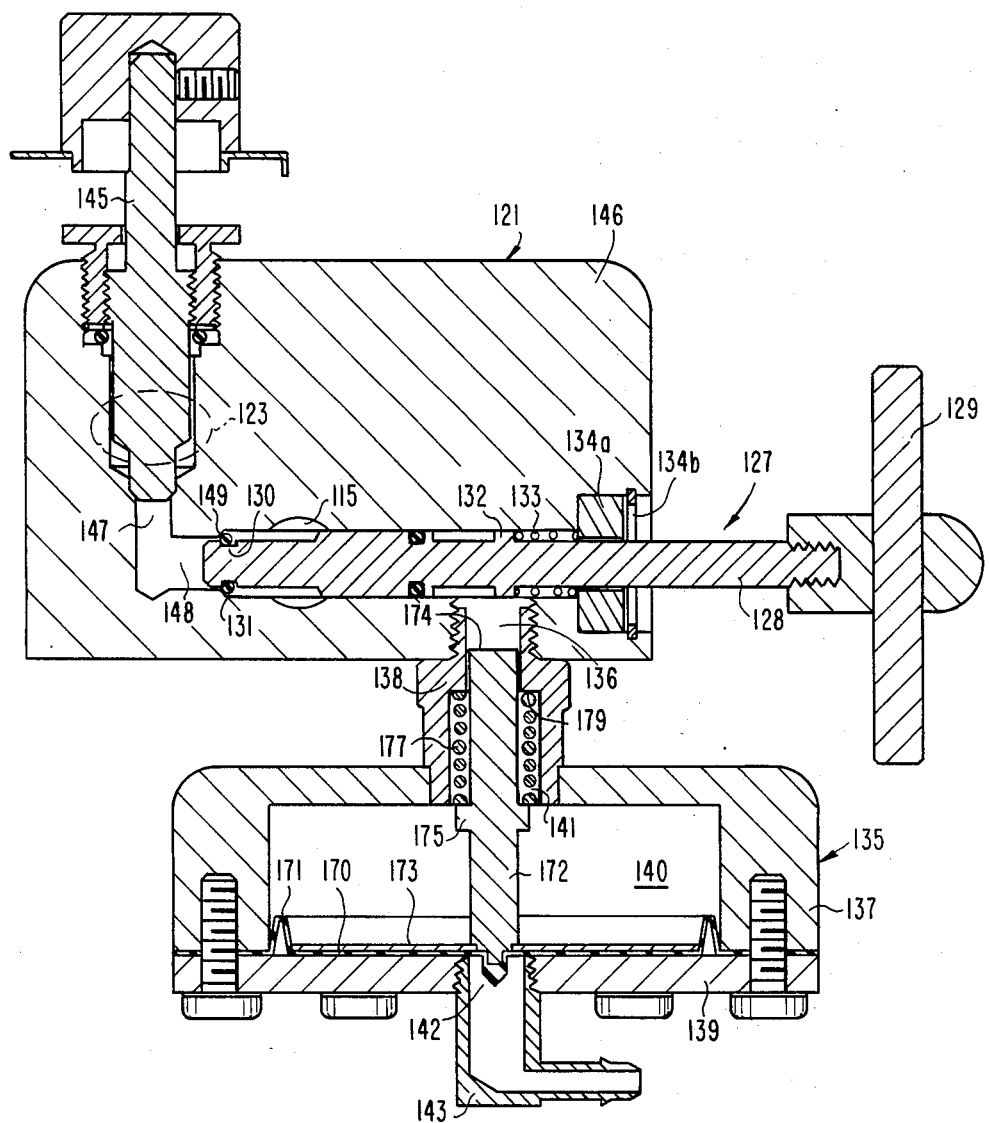
FIG. 7 is a side sectional view of a metering shut-off valve assembly wit the formulation shut-off assembly of the preferred embodiment of the present invention, shown with the formulation shut-off assembly in the closed position.

Referring specifically to FIG. 7, the formulation shut-off assembly 126 comprises a shut-off valve 127 and a diaphragm actuator 135. The formulation metering valve comprises a metering valve 145 resident in a metering valve body 146. A metering valve bore 147 and a shut-off valve bore 148 intersect within the metering valve body. The formulation tank outlet line 123 communicates with the shut-off valve bore 148, and the formulation output line 115 communicates with the metering valve bore 147. Metering valve 145 controls the size of the opening leading into outlet line 12 from metering valve bore 147. Formulation enters the metering valve body through the formulation tank line 115 and exits through the formulation outlet line 123.

The shut-off valve 127 includes a valve stem 128 that is inserted into the shut-off valve bore 148. The valve stem is threadedly engaged at one end to a tee handle 129, which is used to pull the valve stem within the shut-off valve bore 148. A seal ring groove 130 with a resilient seal ring or O-ring 131 mounted therein is situated at the distal end of the valve stem. When the formulation flow is interrupted, the seal ring resiliently abuts the counterbore shoulder 149 in the shut-off valve bore 148, thus preventing communication of the formulation from the formulation tank line 115 to the formulation metering valve bore 147.

The shut-off valve stem 128 also comprises a locking shoulder 132, located generally mid-length along the valve stem, as shown in FIG. 7. Abutting one side of the locking shoulder is a helical spring 133, which reacts against a back-up disk 134a that is held within the metering valve body by a snap ring 134b. The object of the spring 134 is to positively bias the shut-off valve stem 128 in the closed position—that is, with the seal ring 131 abutting the counterbore shoulder 149 at the distal end of the shut-off valve stem. The back-up disk 134a and snap ring 134b, in addition to operating as a reaction surface for the spring, also serve to retain the shut-off valve stem within the shut-off valve bore.

A transverse bore 136 in the metering valve body 146 communicates with the shut-off valve bore 148 proximate the locking shoulder 132 on the shut-off valve stem 128. When the shut-off valve stem 128 is in the normally closed position, the locking shoulder 132 is directly aligned with a portion of the transverse bore 136, although not completely obstructing the bore. The diaphragm actuator 135 is disposed directly over the transverse bore 136, and is abuttingly mounted on the metering valve body 146.

The diaphragm actuator 135 comprises a diaphragm housing 137, which includes a threaded adapter fitting 138, to be threaded into the transverse bore 136 in the metering valve body. A back-up plate 139 is mounted on the diaphragm housing 137 to form an actuator chamber 140 within. A bore 141 through the adapter fitting 138 communicates between the actuator chamber 140 and the transverse bore 136 in the metering valve body. A pressure bore 142 is situated in the back-up plate 139 opposite the adapter fitting bore 141. A tube fitting 143 is threaded into the pressure bore 142. A pressure line 144 (FIG. 1) is engaged on the fitting 143 and communicates directly with the combustion antechamber 20 to transmit pressure generated in the antechamber to the diaphragm actuator 135.

A diaphragm 170 is mounted adjacent the back-up plate 139 and directly over the pressure bore 142. The diaphragm 170 includes at its perimeter a circumferential shoulder 171 projecting into the actuator chamber 140. A diaphragm interface plate 173, having an engagement pin 172 centrally affixed thereto, abuts the diaphragm 170 and is surrounded by the circumferential shoulder 171. The engagement pin 172 extends upward through the diaphragm chamber 140 and through the adapter fitting bore 141. The engagement pin 172 comprises a locking end 174, and the pin is sized so that the locking end 174 extends beyond the end of the adapter fitting bore 14 and into the shut-off valve bore 148 when the diaphragm 170 is flexed. When the diaphragm is in its relaxed state, as shown in FIG. 7, the locking end 174 is retracted fully within the bore 141.

The engagement pin 172 includes a helical spring mounting land 175. The engagement pin 172 passes through a spring 177 situated in the adapter fitting bore 141, so that the spring 177 is trapped between the spring mounting land 175 and a spring mounting shoulder 179 in the adapter fitting bore 141. The spring 177, when operating against the spring mounting land 175, acts to normally bias the engagement pin 172 in the retracted position, that is, where the engagement pin locking end 174 does not extend beyond the end of the adapter fitting bore 141. However, when pressure from combustion in the antechamber passes through the pressure tube 144 into the pressure bore 142, the diaphragm 170 is flexed toward the adapter fitting bore 141 and into the actuator chamber 140. When the diaphragm 170 is flexed, the engagement pin 172 is extended through the adapter fitting bore 141 and the locking end 174 projects into the shut-off valve bore 148 of the metering valve body 146.

Figure 8:
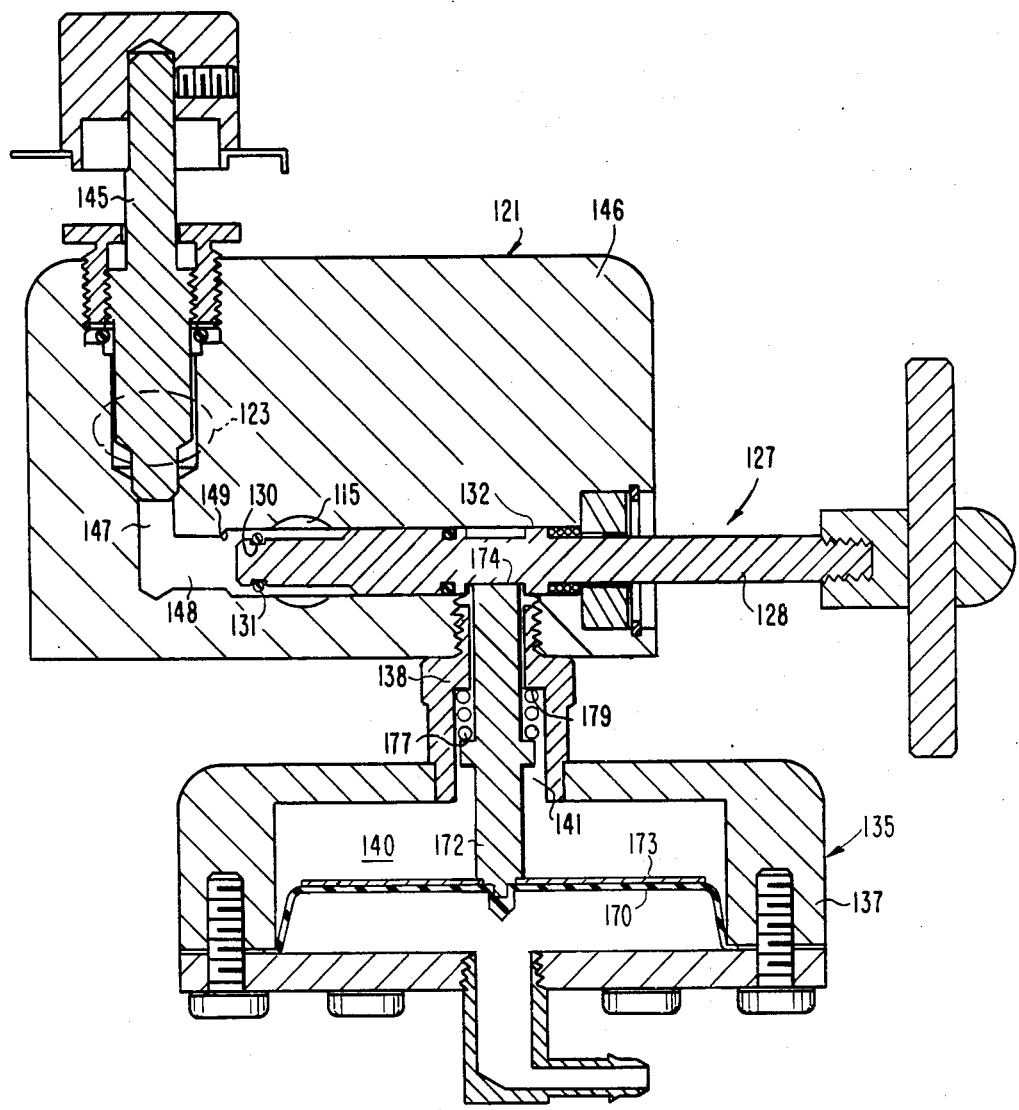
FIG. 8 is a side sectional view of the structure shown in FIG. 7, shown with the formulation shut-off assembly in the open position.

When the engagement pin 172 is in its extended position, projecting into the shut-off valve bore, the locking end 174 of the pin engages with the locking shoulder 132 of the shut-off valve stem 128, provided the stem has been initially retracted. When the shut-off valve stem 128 is in the normally closed position, as shown in FIG. 7, the locking shoulder 132 prevents the locking end 174 of the engagement pin 172 from entering the shut-off valve bore 148. However, when the valve stem 128 is retracted manually by the operator, the locking shoulder 132 is moved away from the transverse bore 136 and the locking end 174 of the engagement pin 172 is free to travel into the shut-off valve bore 148 and abut the locking shoulder 132, as shown in FIG. 8

With the engagement pin 172 in its extended position, the locking end of the engagement pin prevents the valve stem from moving within the bore, thereby keeping the shut-off valve 127 open. As long as pressure from the antechamber keeps the diaphragm 170 in the flexed position (FIG. 8), the engagement pin 172 remains in the extended position and the shut-off valve stem 128 will remain in the open position. Once the air pressure acting on the diaphragm is terminated, the diaphragm 170 relaxes (FIG. 7), the engagement pin 172 retracts, the locking end 174 of the engagement pin retracts from the shut-off valve bore 148, and the shut-off valve spring 133 acts against the locking shoulder 132 of the valve stem 128 to push the valve stem 128 into the normally closed position.

When the diaphragm 170 is flexed due to pressure from the antechamber 20, the diaphragm interface plate 173 ensures that the diaphragm 170 flexes in an even and generally planar fashion so that the engagement pin 172 is stroked smoothly in the bore 141. The circumferential shoulder 171 of the diaphragm 170 allows the diaphragm 170 to invert as it flexes, until the circumferential shoulder 171 is eliminated as shown in FIG. 8. When the pressure is removed behind the diaphragm 170, the spring 177 acts on the engagement pin 172 and diaphragm interface plate 173, which pushes on the diaphragm 170 to re-invert it to its relaxed position (FIG. 7).

The formulation shut-off valve assembly 126 of Applicants' preferred embodiment represents an improvement over the "dead man" throttle of the prior art. The dead man throttle, such as the throttle described in the Curtis Patent, U.S. Pat. No. 4,030,655 requires that the operator constantly press the throttle lever in order to maintain flow of the formulation into exhaust tube of the pulse fog generator. In order to shut off the flow of the formulation in an emergency situation, such as when the engine dies after having run out of fuel, it is incumbent upon the operator to quickly release the dead man throttle, thereby terminating flow of the formulation. The formulation shut-off valve assembly of Applicants' invention makes this safety feature entirely automatic and dependent only upon the continued operation of the resonant combustion device of the pulse fog generator.

This safety feature of Applicants' invention is enabled once the resonant combustion device is in self-sustained operation, by pulling the tee handle 129 of the shut-off valve 127. In this instance, the seal ring 131 at the distal end of the shut off valve stem 128 is unseated from the counterbore shoulder 149, thereby opening the passage between the formulation tank line 11 and the formulation metering valve bore 147. Since the combustion device is operating, pressure is developed within the antechamber, and the diaphragm in the diaphragm actuator assembly is flexed. When the shut-off valve stem 128 is pulled back sufficiently far, the locking shoulder 132 moves away from the transverse bore 136 to allow the locking end 174 of the engagement pin 172 to enter the shut-off valve bore 148 and lock against the locking shoulder 132. Once the shut-off valve handle has been pulled by the operator, the operator need do no more to activate the safety feature of this shut-off valve assembly. As previously described, once the engine shuts down, for whatever reason, the pressure from the antechamber to the diaphragm ceases, the diaphragm is restored to its unflexed position, and the engagement pin is retracted by operation of the spring 177. The valve stem is restored to its normally closed position, thereby terminating flow of formulation from the formulation tank through the formulation metering valve.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pulse fog generator including a resonant intermittent combustion device composed of a combustion chamber and an exhaust tube communicating with the combustion chamber, one end of the tube discharging gases resulting from, and discharged under pressure produced by, combustion in the combustion chamber, an antechamber, communicating with said combustion chamber for providing a fuel-air mixture to said combustion chamber, a carburetor for supplying the fuel-air mixture to the antechamber and including a central throat passage, through which intake air flows during operation of the combustion device, a spark generating system, including a power source, for igniting the fuel-air mixture in the antechamber, a tank providing a reservoir of formulation and a formulation line through which formulation flows from the tank to the exhaust tube, the pulse fog generator comprising:

electric starting air supply means, electrically connected to the power source, including;
        flexible air pumping means for pumping atmosphere air into the antechamber in response to expansion and contraction of said flexible air pumping means; and
        air pump driving means for driving said flexible air pumping means and including an electric motor;
    priming pump means for directing a quantity of starting fuel into the carburetor, including;
        a priming fuel chamber hydraulically communicating with the carburetor; and
        a priming pump piston reciprocatable within said priming fuel chamber and operable to draw fuel into said priming fuel chamber, and to discharge the fuel from said priming fuel chamber into said central throat passage of the carburetor;
    means for terminating the flow of air through the central throat passage of the carburetor, including;
        a shut-off plate movable between a first position preventing the flow of air through the central throat passage and a second position allowing the flow of air through the central throat passage;

a plunger attached to said shut-off plate, operable to move said shut-off plate between said first and second positions;

mounting means for slidably mounting said plunger on the carburetor so that said plunger can be operated to move said shut-off plate into said first position; and biasing means for normally biasing said shut-off plate into said second position; and pressure responsive means, adapted to be interposed in the formulation line, for terminating the flow of formulation through the formulation line in response to a cessation in operation of the resonant intermittent combustion device.

2. The pulse fog generator according to claim 1, wherein:

said flexible air pumping means further includes;
a bellows having a discharge opening; and
check valve means mounted over said discharge opening for controlling the flow of atmosphere air into and out of said bellows;

said electric motor includes a rotatable output shaft; and said air pump driving means further includes;
means for reciprocating said bellows with the rotation of said output shaft, said reciprocating means eccentrically mounted to said output shaft.

3. The pulse fog generator according to claim 2, wherein:

said electric motor is electrically connected to the power source in parallel with the spark generating system; and said starting air supply means further includes a switch for making and breaking the electrical connection between the power source and each of said electric motor and the spark generating system simultaneously.

4. The pulse fog generator according to claim 1, wherein said priming pump means further includes:

a priming pump adaptor having a bore hydraulically communicating between the carburetor and said priming fuel chamber, said priming pump adaptor adapted to be received within said priming fuel chamber in press-fit engagement.

5. The pulse fog generator according to claim 1, wherein said pressure responsive means comprises:

two position valve means for obstructing flow through the formulation line having a first position in which flow through the formulation line is obstructed and a second position in which flow through the formulation line is unobstructed;

biasing means for biasing said two position valve means to said first position; and locking means for removably restraining said two position valve in said second position in response to pressure produced by the combustion, said restraint being removed when the pressure ceases.

6. The pulse fog generator according to claim 5, wherein:

said two position valve means includes a valve stem having a locking shoulder; and said locking means includes;

a diaphragm operable by the pressure from combustion in the antechamber and having a flexed position when subject to pressure and a relaxed position otherwise; and a locking pin extending from said diaphragm and movable between a locking position, when said diaphragm is in said flexed position, in which said locking pin contacts said locking shoulder to hold said two position valve means in said second position, and an open position, when said diaphragm is in said relaxed position, in which said locking pin does not contact said locking shoulder.

7. A starting system for a resonant intermittent combustion device having a combustion antechamber, a fuel-air supply for supplying a fuel-air mixture to the antechamher, and a spark generating system, including a power source, for igniting the fuel-air mixture in the antechamber, the starting system comprising:

an electric motor, electrically connected to the power source, including a movable output;

flexible air pumping means, having a discharge opening, for pumping atmosphere air in response to expansion and contraction of said flexible air pumping means;

means, connected between said output and said flexible air pumping means, for expanding and contracting said flexible air pumping means as said output moves;

check valve means mounted over said discharge opening for controlling the flow of air into and out of said flexible air pumping means; and a starting air supply conduit extending from said check valve means and opening into the antechamber to direct a flow of starting air therein, wherein said check valve means includes;

a valve body disposed over said discharge opening having an inlet aperture and an outlet aperture; and a check valve wafer mounted to said valve body, having an integral flexible inlet flapper valve disposed over said inlet aperture and an integral flexible outlet flapper valve disposed over said outlet aperture.

8. The starting system of claim 7, wherein:

said movable output includes a rotatable output shaft;

said flexible air pumping means includes a bellows; and said means for expanding and contracting includes a connecting rod, eccentrically mounted at its one end to said output shaft and mounted at its other end to said bellows opposite said discharge opening, for reciprocating said bellows with the rotation of said output shaft.

9. The starting system of claim 7, wherein:

said electric motor is electrically connected to the power source in parallel with the spark generating system; and said starting system further comprises a switch for making and breaking the electrical connection between the power source and each of said electrical motor and the spark generating system simultaneously.

10. The starting system of claim 7, wherein the fuel-air supply of the resonant intermittent combustion device further includes a carburetor having a throat passage communicating with said combustion antechamber and a fuel tank for supplying fuel to the carburetor, the starting system further comprising:

priming pump means, adapted to be mounted on the carburetor, for directing a quantity of starting fuel into the carburetor, said priming pump means including;

a priming fuel chamber hydraulically communicating with the carburetor; and a priming pump piston reciprocated within said priming fuel chamber and operative to draw fuel from the fuel tank through the carburetor into said priming fuel chamber, and to discharge fuel from said priming fuel chamber into said throat passage of the carburetor.

11. A pulse fog generator comprising:

a resonant intermittent combustion device composed of a combustion chamber and an exhaust tube communicating with said combustion chamber, one end of said tube discharging gases resulting from, and discharged under pressure produced by, combustion in said combustion chamber;

a tank providing a reservoir of formulation;

means for injecting the formulation into said exhaust tube for dispersion into a finely divided condition;

a formulation line through which formulation flows from the tank to the means for injecting; and pressure responsive means, interposed in said formulation line, for terminating the flow of formulation through said formulation line in response to a cessation in operation of said resonant intermittent combustion device.

12. The pulse fog generator according to claim 11, wherein said pressure responsive means comprises:

two position valve means for obstructing flow through said formulation line, having a first position in which flow through said formulation line is obstructed and a second position in which flow through said formulation line is unobstructed;

biasing means for biasing said two position valve means to said first position; and locking means for removably restraining said two position valve in said second position in response to pressure produced by the combustion, said restraint being removed when the pressure ceases.

13. The pulse fog generator according to claim 12, wherein:

said two position valve means includes a valve stem having a locking shoulder; and said locking means includes;

a diaphragm operable by the pressure from combustion in the antechamber and having a flexed position when subject to pressure and a relaxed position otherwise; and a locking pin extending from said diaphragm and movable between a locking position, when said diaphragm is in said flexed position, in which said locking pin contacts said locking shoulder to hold said two position valve means in said second position, and an open position, when said diaphragm is in said relaxed position, in which said locking pin does not contact said locking shoulder.

14. The pulse fog generator according to claim 13, wherein:

said diaphragm is an inverting diaphragm; and said locking means further includes biasing means associated with said locking pin for biasing said pin and said diaphragm to said open position.

15. A pressure responsive flow control apparatus for a pulse fog generator having a resonant intermittent combustion device composed of a combustion chamber, and an exhaust tube communicating with the combustion chamber, one and of said tube discharging gases resulting from, and discharged under pressure produced by, combustion in the combustion chamber, a tank providing a reservoir of formulation, a formulation injector for injecting the formulation into the exhaust tube, and a formulation line through which formulation flows from the tank to the formulation injector, the flow control apparatus comprising:

two position valve means, adapted to be interposed in the formulation line, for obstructing flow through the formulation line, having a first position in which flow through the formulation line is obstructed and a second position in which flow through the formulation line is unobstructed;

biasing means for biasing said two position valve means to said first position; and locking means for removably restraining said two position valve in said second position in response to pressure produced by the combustion, said restraint being removed when the pressure ceases.

16. The pulse fog generator according to claim 15, wherein:

said two position valve means includes a valve stem having a locking shoulder; and said locking means includes;

a diaphragm operable by the pressure from combustion in the antechamber and having a flexed position when subject to pressure and a relaxed position otherwise; and a locking pin extending from said diaphragm and movable between a locking position, when said diaphragm is in said flexed position, in which said locking pin contact said locking shoulder to hold said two position valve means in said second position, and an open position, when said diaphragm is in said relaxed position, in which said locking pin does not contact said locking shoulder.

17. The pulse fog generator according to claim 16, wherein:

said diaphragm is an inverting diaphragm; and said locking means further includes biasing means associated with said locking pin for biasing said pin and said diaphragm to said open position.

* * * * *

UNITED STATES PATENT AND TRADEMARK OFFICE
CERTIFICATE OF CORRECTION

PATENT NO. : 4,811,901

DATED : March 14, 1989

INVENTOR(S) : Robert E. Stevens and Dennis A. Roudebush

It is certified that error appears in the above-identified patent and that said Letters Patent is hereby corrected as shown below:

In column 6, line 65, please change "a" to --an--.
In column 8, line 30, please change "a" to --an--.
In column 9, line 53, please change "12" to --123--.
In column 10, line 51, please change "14" to --141--.
In column 11, line 19, please insert after the number 8 --.--.
In column 14, line 58, please change "electrical" to --electric--.
In column 15, line 5, please change "reciprocated" to --reciprocatable--.
In column 16, line 13, please change "and" to --end--.
In column 16, line 45, please change "contact" to --contacts--.

Signed and Sealed this

First Day of August, 1989

Attest:

DONALD J. QUIGG

Attesting Officer

Commissioner of Patents and Trademarks